(12) United States Patent
Kiyokawa et al.

(10) Patent No.: US 11,609,149 B2
(45) Date of Patent: Mar. 21, 2023

(54) STATE ESTIMATION APPARATUS, STATE ESTIMATION METHOD, AND COMPUTER-READABLE RECORDING MEDIUM

(71) Applicant: NEC Corporation, Tokyo (JP)

(72) Inventors: Yu Kiyokawa, Tokyo (JP); Shigeru Kasai, Tokyo (JP); Shohei Kinoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/425,790

(22) PCT Filed: Jan. 28, 2019

(86) PCT No.: PCT/JP2019/002810
§ 371 (c)(1),
(2) Date: Jul. 26, 2021

(87) PCT Pub. No.: WO2020/157810
PCT Pub. Date: Aug. 6, 2020

(65) Prior Publication Data
US 2022/0163422 A1 May 26, 2022

(51) Int. Cl.
*G01M 5/00* (2006.01)
*G06K 9/62* (2022.01)

(52) U.S. Cl.
CPC ........ *G01M 5/0066* (2013.01); *G01M 5/0008* (2013.01); *G01M 5/0033* (2013.01); *G06K 9/6256* (2013.01); *G06K 9/6277* (2013.01)

(58) Field of Classification Search
CPC ............. G01M 5/0066; G01M 5/0008; G01M 5/0033; G01M 7/00; G01M 99/00;
(Continued)

(56) References Cited

U.S. PATENT DOCUMENTS

| 8,391,619 B2 * | 3/2013 | Kawata | G06V 20/693 382/242 |
| 2004/0176934 A1 * | 9/2004 | Kihira | G01N 17/006 324/700 |

(Continued)

FOREIGN PATENT DOCUMENTS

| CN | 108108765 A | 6/2018 |
| JP | 2007-140608 A | 6/2007 |

(Continued)

OTHER PUBLICATIONS

International Search Report for PCT Application No. PCT/JP2019/002810, dated Apr. 16, 2019.

(Continued)

*Primary Examiner* — Raul J Rios Russo
*Assistant Examiner* — Carl F. R. Tchatchouang

(57) ABSTRACT

A state estimation apparatus 1 includes an acquisition unit 2 that acquires deterioration information indicating a deterioration state of each structural object and a learning unit 3 that learns common information that is common between pieces of the deterioration information and estimation index information that is used for estimating a deterioration state of a target structural object, using the deterioration information as input.

9 Claims, 6 Drawing Sheets

(58) Field of Classification Search
CPC .... G06K 9/6256; G06K 9/6277; G01H 13/00; G01N 29/12; G06Q 10/00; G06Q 50/08
See application file for complete search history.

(56) References Cited

U.S. PATENT DOCUMENTS

| | | | |
|---|---|---|---|
| 2007/0157730 A1* | 7/2007 | Ochiai | G21C 17/017 73/627 |
| 2017/0116383 A1* | 4/2017 | Ziavras | G16H 40/67 |
| 2018/0306669 A1 | 10/2018 | Mase et al. | |

FOREIGN PATENT DOCUMENTS

| | | |
|---|---|---|
| JP | 2017-150887 A | 8/2017 |
| JP | 6263455 B2 | 1/2018 |
| WO | 2017/064855 A1 | 4/2017 |

OTHER PUBLICATIONS

Sugiyama Masashi, "A New Approach to Machine Learning Based on Density Ratios", Proceedings of the Institute of Statistical Mathematics, vol. 58, No. 2, 2010, pp. 141-155.

English translation of Written opinion for PCT Application No. PCT/JP2019/002810, dated Apr. 16, 2019.

* cited by examiner

Fig.3

| STRUCTURAL OBJECT A | DETERIORATION INFORMATION A1 | ENVIRONMENT CONDITION A1 | DETERIORATION INFORMATION A2 | ENVIRONMENT CONDITION A2 | ... |
|---|---|---|---|---|---|
| | | RESONANCE ANGULAR FREQUENCY A1 | | RESONANCE ANGULAR FREQUENCY A2 | ... |
| | | DAMPING RATIO A1 | | DAMPING RATIO A2 | ... |
| | | ... | | ... | ... |
| STRUCTURAL OBJECT B | DETERIORATION INFORMATION B1 | ENVIRONMENT CONDITION B1 | DETERIORATION INFORMATION B2 | ENVIRONMENT CONDITION B2 | ... |
| | | RESONANCE ANGULAR FREQUENCY B1 | | RESONANCE ANGULAR FREQUENCY B2 | ... |
| | | DAMPING RATIO B1 | | DAMPING RATIO B2 | ... |
| | | ... | | ... | ... |
| ... | ... | ... | | ... | |

31

| STRUCTURAL OBJECT INFORMATION ||||||
|---|---|---|---|---|---|
| STRUCTURAL OBJECT A | TYPE A | STRUCTURAL OBJECT B | TYPE B | ... |
| | DIMENSION A | | DIMENSION B | ... |
| | MATERIAL A | | MATERIAL B | ... |
| | ... | | ... | ... |

32

STATE ESTIMATION APPARATUS, STATE ESTIMATION METHOD, AND COMPUTER-READABLE RECORDING MEDIUM

This application is a National Stage Entry of PCT/JP2019/002810 filed on Jan. 28, 2019, the contents of all of which are incorporated herein by reference, in their entirety.

TECHNICAL FIELD

The present invention relates to a state estimation apparatus and a state estimation method for estimating the state of a structural object, and furthermore relates to a computer-readable recording medium on which a program for realizing these is recorded.

BACKGROUND ART

Heretofore, when a structural object is repaired, the target structural object is inspected, the deterioration state of the structural object is obtained, and repair is made in accordance with the deterioration state. In addition, the deterioration state of the structural object is estimated based on data acquired when inspection and repair were performed in the past, and repair is made according to the estimated deterioration state.

As a related technique, Patent Document 1 discloses a structural object repair execution plan assistance system that makes a determination on whether or not each structural object needs to be repaired, and presents the determination result to the user. According to the system, the degree of necessity indicating whether or not the structural object needs to be repaired is calculated using deteriorating factor data of a structural object and repair accomplishment data by referring to a criterion for determining whether or not repair is required.

LIST OF RELATED ART DOCUMENTS

Patent Document

Patent document 1: Japanese Patent Laid-Open Publication No. 2007-140608

SUMMARY

Technical Problems

However, in Patent Document 1, the deterioration state of a target structural object is estimated using data acquired when the target structural object was inspected and repaired in the past. Therefore, if the number of pieces of data acquired when inspection and repair were performed in the past is small, the accuracy for estimating the deterioration state of the target structural object decreases.

Specifically, in a case of a structural object such as a newly built bridge, the number of pieces of data acquired when inspection and repair were performed is small, and thus the deterioration state of the bridge cannot be accurately estimated.

An example object of the present invention is to provide a state estimation apparatus, a state estimation method, and a computer-readable recording medium for accurately estimating the deterioration state of a structural object.

Solution to the Problems

In order to achieve the aforementioned object, a state estimation apparatus according to an example aspect of the present invention includes:

an acquisition unit that acquires deterioration information indicating a deterioration state of each structural object; and earning unit that learns common information that is common between pieces of the deterioration information and estimation index information that is used for estimating a deterioration state of a target structural object, using the deterioration information as input.

Also, in order to achieve the aforementioned object, a state estimation method according to an example aspect of the present invention includes:

acquiring deterioration information indicating a deterioration state of each structural object; and learning common information that is common between pieces of the deterioration information and estimation index information that is used for estimating a deterioration state of a target structural object, using the deterioration information as input.

Furthermore, in order to achieve the aforementioned object, a computer-readable recording medium according to an example aspect of the present invention includes a program recorded thereon, the program including instructions that cause a computer to carry out:

acquiring deterioration information indicating a deterioration state of each structural object; and learning common information that is common between pieces of the deterioration information and estimation index information that is used for estimating a deterioration state of a target structural object, using the deterioration information as input.

Advantageous Effects of the Invention

As described above, according to the present invention, it is possible to accurately estimate a deterioration state of a structural object.

BRIEF DESCRIPTION OF THE DRAWINGS

FIG. 3 is a diagram showing an example of the data structure of deterioration information and structural object information.

EXAMPLE EMBODIMENT

Example Embodiment

The following describes an exemplary embodiment of the present invention with reference to FIGS. 1 to 6.

[Apparatus Configuration]

First, the configuration of a state estimation apparatus at the time of learning according to the present exemplary embodiment will be described with reference to FIG. 1. FIG.

1 is a diagram showing an example of the state estimation apparatus at the time of learning.

Figure 1:
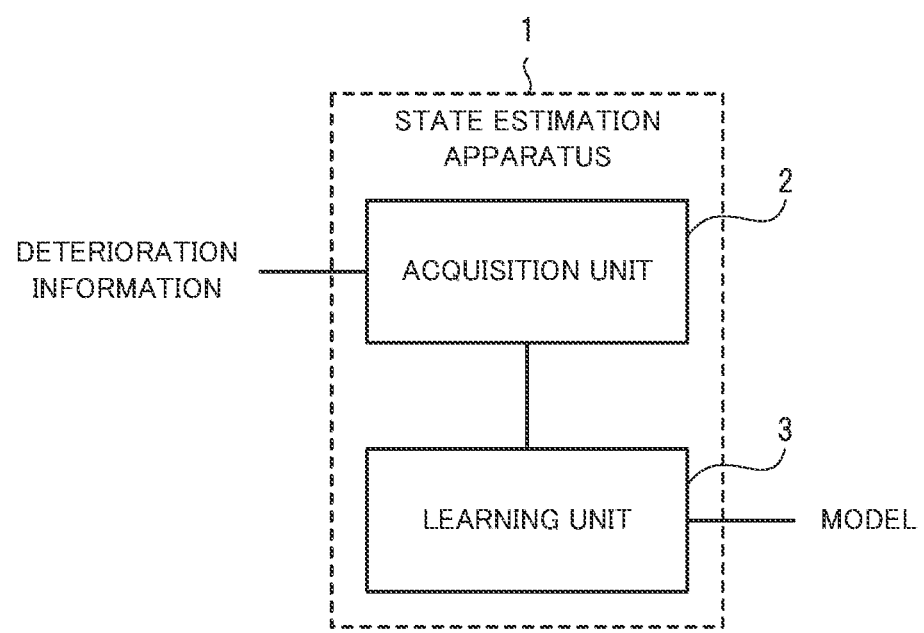
FIG. 1 is a diagram showing an example of a state estimation apparatus at the time of learning.

A state estimation apparatus 1 shown in FIG. 1 is an apparatus that accurately estimates the deterioration state of a structural object. Also, as shown in FIG. 1, the state estimation apparatus 1 includes an acquisition unit 2 and a learning unit 3.

From among these, the acquisition unit 2 acquires pieces of deterioration information indicating the deterioration states of respective structural objects. The learning unit 3 learns common information that is common between the pieces of deterioration information and estimation index information that is used for estimating the deterioration state of a target structural object, using the deterioration information as input.

The structural object is a structural object constructed using a hardened object obtained by solidifying at least sand, water, and cement (concrete or mortar, etc.), a metal, or a combination thereof. The structural object may be a bridge, for example. In addition, the structural object may be the entirety or a portion of a building. Furthermore, the structural object may be the entirety or a portion of a machinery.

The deterioration information is information that is used for indicating a change that has occurred in the structural object. Specifically, the deterioration information is information that is used for indicating the degree of damage. If the structural object is a bridge, for example, the deterioration information is a result of hammering inspection executed on the bridge. Note that it is conceivable that a resonant frequency, a damping ratio, or the like is used as the deterioration information.

The common information is a numerical value or the like that is common between pieces of deterioration information of a plurality of structural objects. The estimation index information is information indicated using common information. Examples of the estimation index information include resonant frequencies and probability density ratios of damping ratios in deterioration information of a plurality of structural objects.

In this manner, in the present exemplary embodiment, the state of a target structural object can be estimated using a model generated by a learning unit, in other words an invariant (common information, estimation index information) that is common between a plurality of structural objects. Therefore, even if the amount of deterioration information of a target structural object is small, the state of the target structural object can be accurately estimated.

[System Configuration]

Figure 2:
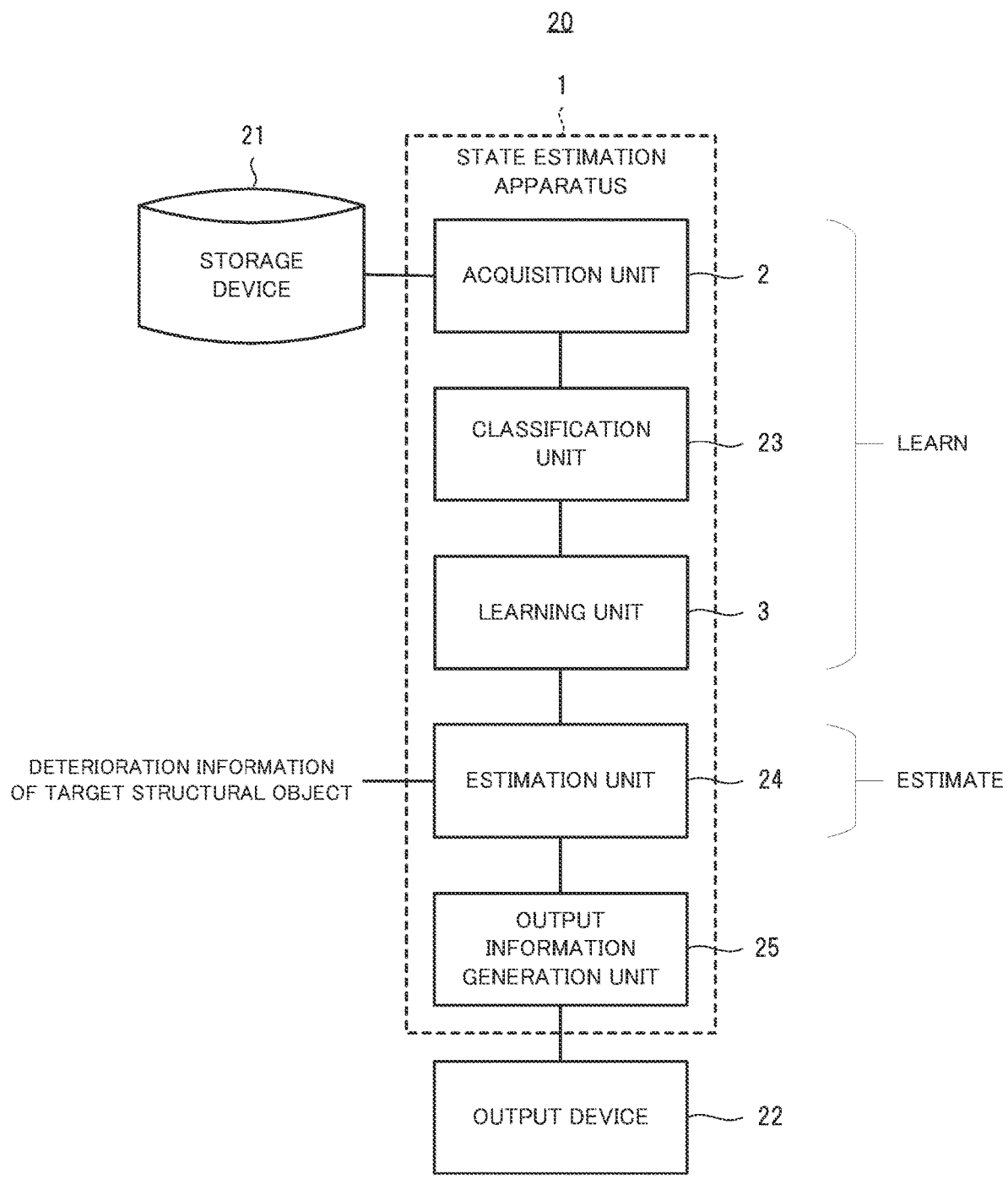
FIG. 2 is a diagram showing an example of a system that includes the state estimation apparatus.

Next, the configuration of the state estimation apparatus 1 according to the present exemplary embodiment will be more specifically described with reference to FIG. 2. FIG. 2 is a diagram showing an example of a system that includes the state estimation apparatus.

As shown in FIG. 2, a system 20 includes a storage device 21 and an output device 22 in addition to the state estimation apparatus 1. In addition, the state estimation apparatus 1 includes a classification unit 23, an estimation unit 24, and an output information generation unit 25 in addition to the acquisition unit 2 and the learning unit 3.

The storage device 21 stores deterioration information indicating the deterioration state of a structural object, structural object information indicating the structure of the structural object, and the like. Specifically, the storage device 21 stores deterioration information 31 and structural object information 32 shown in FIG. 3, and the like. FIG. 3 is a diagram showing an example of the data structure of deterioration information and structural object information.

The deterioration information is information in which identification information for identifying a structural object and deterioration information corresponding to the structural object are associated with each other. In the example of the deterioration information 31 in FIG. 3, deterioration information A1, deterioration information A2, and the like are associated with a "structural object A" for identifying a structural object A, and deterioration information B1, deterioration information B2, and the like are associated with a structural object B. In addition, each of the deterioration information A1, the deterioration information A2, the deterioration information B1, and the deterioration information B2 includes an environment condition, a resonant frequency, a damping ratio, and the like.

The deterioration information A1 includes an environment condition A1, a resonant frequency A1, a damping ratio A1, and the like, and the deterioration information A2 includes an environment condition A2, a resonant frequency A2, a damping ratio A2, and the like. Also, the deterioration information B1 includes an environment condition B1, a resonant frequency B1, a damping ratio B1, and the like, and the deterioration information B2 includes an environment condition B2, a resonant frequency B2, a damping ratio B2, and the like.

An environment condition is information indicating the environment state of the surroundings of a structural object when deterioration of the structural object is measured. Examples of the environment condition include the temperature, humidity, salt concentration in air, and the like when deterioration is measured. Note that, when the structural object is a bridge, the environment information may also include the traffic amount of vehicles and the like.

A resonant frequency and a damping ratio are information indicating the deterioration state of a structural object. The resonant frequency is a frequency at which the vibration amplitude of a structural object increases rapidly when the structural object is vibrated from the outside by a hammer, a shaker, or the like. The damping ratio is, for example, a value indicating the degree of a decrease in the vibration amplitude of a structural object vibrating at a resonant frequency, when the structural object stops being shaken.

In the structural object information, information indicating the type, dimension, material and the like of a structural object is associated with identification information for identifying the structural object. In the example of the structural object information 32 in FIG. 3, a type A, a dimension A, and a material A are associated with the structural object A, and a type B, a dimension B, and a material B are associated with the structural object B.

For example, when the structural object is a bridge, "type" is information for identifying a girder bridge, a truss girder bridge, an arched bridge, a rigid-frame bridge, a cable-stayed bridge, a suspension bridge, or the like. For example, when the structural object is a bridge, "dimension" is information indicating a dimension such as a bridge length, a distance between supports, a span length, or a clear span. For example, when the structural object is a bridge, "material" is information indicating the material of a bridge such as a timber bridge, a stone bridge, a steel bridge, a concrete bridge, or a combination bridge.

Note that the storage device 21 may be provided in the state estimation apparatus 1, for example, or may be provided outside of the state estimation apparatus 1.

The output device 22 acquires output information that has been converted by the output information generation unit 25 so as to be in an outputtable format, and that indicates an estimation result to be described later, and outputs an image, a sound, or the like that is generated based on the output information. The output device 22 is, for example, an image display device that employs liquid crystal, organic EL (Electro Luminescence), or a CRT (Cathode Ray Tube). Furthermore, the image display device may include a sound output device such as a speaker. Note that the output device 22 may be a printing device such as a printer.

A learning phase will be described.

In a learning phase, the acquisition unit 2 acquires deterioration information required for learning. Specifically, the acquisition unit 2 acquires, from the storage device 21, deterioration information indicating the deterioration state of a structural object, and supplies the acquired deterioration information to the classification unit 23.

In the learning phase, the classification unit 23 classifies the deterioration information using an environment condition indicating the environment state when the deterioration information was measured and structural object information indicating the structure of the structural object. Specifically, if the structural object is a bridge, the classification unit 23 classifies the deterioration information according to the type of structural object using the structural object information. Specifically, if the structural object is a bridge, the classification unit 23 classifies the deterioration information, for example, according to the traffic volume, air temperature, or distance to the ocean, using the environment condition.

In the learning phase, the learning unit 3 learns common information and estimation index information using the deterioration information as input. Specifically, the learning unit 3 first acquires the deterioration information classified by the classification unit 23. Next, the learning unit 3 learns common information that is common between a plurality of structural objects and estimation index information that is used for estimating the deterioration state of the target structural object, using the classified deterioration information as input.

It is conceivable that the Kullback-Leibler density ratio estimation method, the unconstrained least square density ratio estimation method, or the like is used for learning.

For example, a case will be described in which the storage device 21 stores deterioration information $D^A$ of the structural object A (a resonant frequency $\omega_1$ and a damping ratio $\zeta_1$ in a deterioration state 1, and a resonant frequency $\omega_2$ and a damping ratio $\zeta_2$ in a deterioration state 2) and deterioration information $D^B$ of the structural object B (the resonant frequency $\omega_1$ and the damping ratio $\zeta_1$ in the deterioration state 1).

In that case, the learning unit 3 learns the common information and estimation index information, using the deterioration information $D^A$ and the deterioration information $D^B$ as input. Learning will be described using Math. 1.

$$D^A = \{\omega_1, \zeta_1, \omega_2, \zeta_2\} \quad \text{[Math. 1]}$$

$$D^B = \{\omega_1, \zeta_1\}$$

$$pd = \frac{p_B(\omega_1, \zeta_1)}{p_A(\omega_1, \zeta_1)}$$

$D^A$: deterioration information of structural object A
$D^B$: deterioration information of structural object B
$\omega$: resonant frequency
$\zeta$: damping ratio
pd: probability density ratio Common information that is common between the deterioration information $D^A$ and the deterioration information $D^B$ expressed as Math. 1 is the resonant frequency $\omega_1$ and the damping ratio $\zeta_1$, and thus a probability density ratio pd is learned using the resonant frequency $\omega_1$ and the damping ratio $\zeta_1$ as estimation index information.

An estimation phase will be described.

In an estimation phase, the estimation unit 24 receives deterioration information of a target structural object, and estimates the deterioration state of the target structural object using a model generated by the learning unit 3. Specifically, the estimation unit 24 first acquires the deterioration information of the target structural object from an input device.

Next, the estimation unit 24 receives the acquired deterioration information of the target structural object, and estimates the deterioration state of the target structural object using the learned common information and estimation index information. Next, the estimation unit 24 outputs the estimation result of the target structural object (estimated deterioration state) to the output information generation unit 25.

A case will be described in which the above-described deterioration state $D^B$ of the structural object B is input to the estimation unit 24, and the deterioration state of the structural object B is estimated. A state change of a structural object is indicated by a change rate of a natural vibration frequency, and thus it is conceivable that a function S expressed as Math. 2 is used as the quantitative index of a deterioration state.

$$S(\omega_1, \zeta_1, \omega_2, \zeta_2) := \log\left(\frac{\omega_2}{\sqrt{1-\zeta_2^2}}\right) - \log\left(\frac{\omega_1}{\sqrt{1-\zeta_1^2}}\right) = \quad \text{[Math. 2]}$$

$$\log\left(\frac{f_2}{f_1}\right) = \log\left(\frac{f_1 + \Delta f}{f_1}\right) = \log\left(1 + \frac{\Delta f}{f_1}\right)$$

$f_1$: natural frequency of structural object A
$f_2$: natural vibration frequency of structural object A after change
$\Delta f$: change in frequency In addition, in a conditional probability distribution, Math. 3 holds. Even in a case of different structural objects, if the state changes are similar, it can be assumed that input/output rules before and after the state change are the same.

$$p_A(\omega_2, \zeta_2 | \omega_1, \zeta_1) = p_B(\omega_2, \zeta_2 | \omega_1, \zeta_1) \quad \text{[Math. 3]}$$

$p_A$: conditional probability distribution of structural object A
$p_B$: conditional probability distribution of structural object B
wherein it is assumed that $\Delta f/f$ is invariant for the same state change However, the input deterioration information $D^B$ includes only information of the resonant frequency $\omega_1$ and the damping ratio $\zeta_1$ in the deterioration state 1, and thus it is not possible to estimate an expectation value of the function S of the structural object B. In view of this, the expectation value of the function S of the structural object B is estimated using the learned probability density ratio pd. The estimated expectation value of the function S is expressed as Math. 4.

$$E_B[S(\omega_1, \zeta_1, \omega_2, \zeta_2)] \sim E_A\left[\frac{p_B(\omega_1, \zeta_1)}{p_A(\omega_1, \zeta_1)} S(\omega_1, \zeta_1, \omega_2, \zeta_2)\right] \quad \text{[Math. 4]}$$

In this manner, the state of a target structural object can be estimated using a model generated by a learning unit, in other words an invariant that is common between a plurality of structural objects (common information, estimation index information), and thus, even if the amount of the deterioration information of the target structural object is small, it is possible to accurately estimate the state of the target structural object.

The output information generation unit 25 acquires the deterioration state of the target structural object estimated by the estimation unit 24, converts the acquired deterioration state (estimation result) into a format that can be output by the output device 22, and outputs the result to the output device 22. The output device 22 then presents the estimation result to the user.

[Apparatus Operations]

Figure 4:
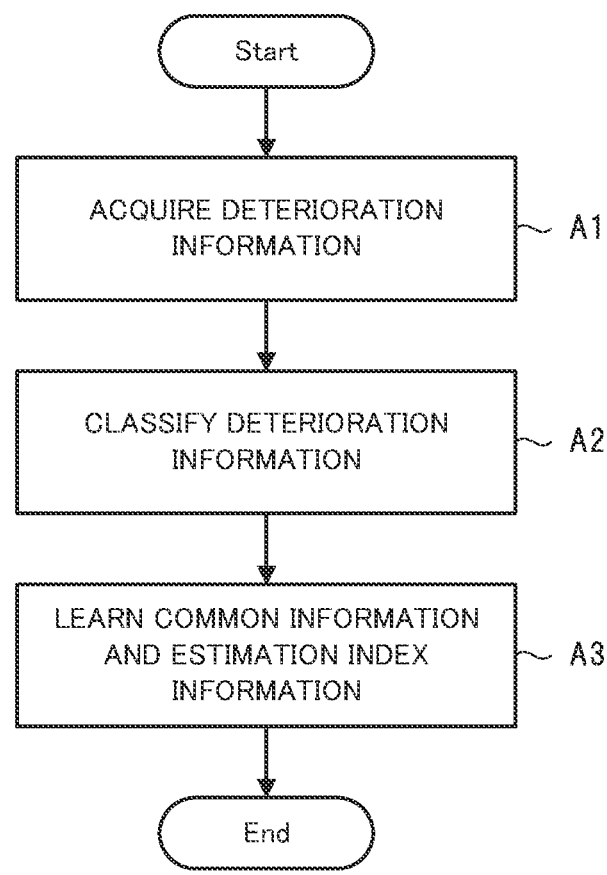
FIG. 4 is a diagram showing an example operation of the state estimation apparatus in a learning phase.
Figure 5:
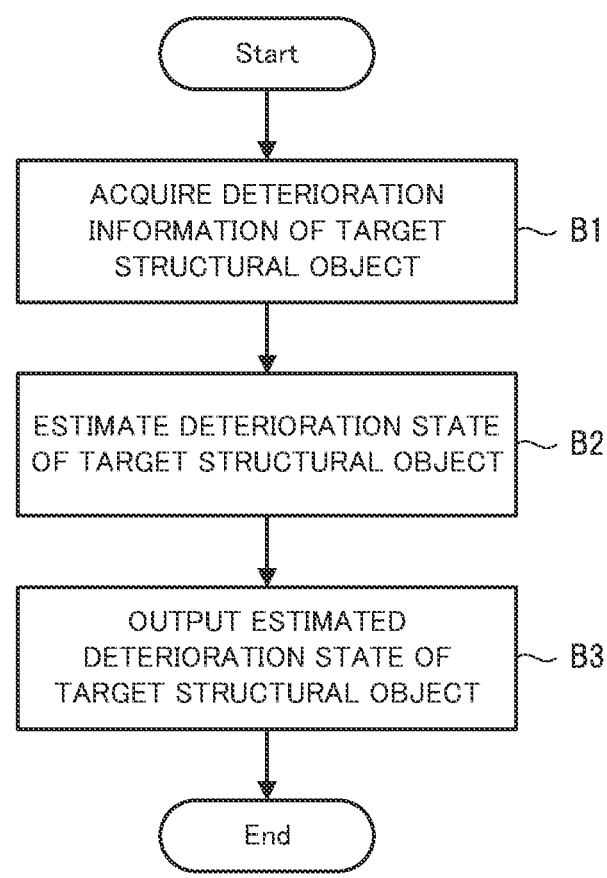
FIG. 5 is a diagram showing an example operation of the state estimation apparatus in an estimation phase.

Next, operations of a state estimation apparatus according to an exemplary embodiment of the present invention will be described with reference to FIGS. 4 and 5. FIG. 4 is a diagram showing an example operation of the state estimation apparatus in the learning phase. FIG. 5 is a diagram showing an example operation of the state estimation apparatus in the estimation phase. In the following description, FIGS. 2 and 3 are referenced as appropriate. Also, in this exemplary embodiment, a state estimation method is performed through operations of the state estimation apparatus. Therefore, a description of the state estimation method according to the present exemplary embodiment is substituted by the following description of operations of the state estimation apparatus.

The learning phase will be described.

As shown in FIG. 4, in the learning phase, the acquisition unit 2 first acquires deterioration information required for learning (step A1). Specifically, in step A1, the acquisition unit 2 acquires deterioration information indicating the deterioration state of a structural object from the storage device 21, and supplies the acquired deterioration information to the classification unit 23.

Next, in the learning phase, the classification unit 23 classifies the deterioration information using an environment condition indicating the environment state when the deterioration information was measured, and structural object information indicating the structure of the structural object (step A2). Specifically, in step A2, when the structural object is a bridge, the classification unit 23 classifies the deterioration information according to the type of structural object using structural object information. Specifically, when the structural object is a bridge, the classification unit 23 classifies the deterioration information according to the traffic volume, air temperature, or distance to the ocean, for example, using the environment condition.

Next, in the learning phase, the learning unit 3 learns common information and estimation index information using the deterioration information as input (step A3). Specifically, in step A3, the learning unit 3 first acquires the deterioration information classified by the classification unit 23.

Next, in step A3, the learning unit 3 learns common information that is common between a plurality of structural objects, and estimation index information that is used for estimating the deterioration state of the target structural object, using the classified deterioration information as input.

The estimation phase will be described.

As shown in FIG. 5, first, in the estimation phase, the estimation unit 24 acquires the deterioration information of a target structural object (step B1). Specifically, in step B1, the estimation unit 24 acquires the deterioration information of a target structural object from an input apparatus.

Next, the estimation unit 24 estimates the deterioration state of the target structural object using a model generated by the learning unit 3 (step B2). Specifically, in step B2, the estimation unit 24 receives the acquired deterioration information of the target structural object, and estimates the deterioration state of the target structural object using the learned common information and estimation index information.

Next, the estimation unit 24 outputs the estimation result (estimated deterioration state) of the target structural object to the output information generation unit 25 (step B3).

[Effects According to Example Embodiment]

As described above, according to the present exemplary embodiment, the state of a target structural object can be estimated using a model generated by a learning unit, in other words an invariant that is common between a plurality of structural objects (common information, estimation index information). Therefore, even if the amount of deterioration information of a target structural object is small, it is possible to accurately estimate the state of the target structural object.

Specifically, even when estimating the deterioration state of a structural object (for example, a bridge) that was newly constructed not long ago and for which the amount of deterioration information is small, it is possible to accurately estimate the current state of the target structural object, as a result of using the learned invariant (learning model) that is common between the target structural object and a structural object that is similar to the target structural object.

Furthermore, it is possible to estimate the state of a target structural object after several years. For example, if there is deterioration information for several years of a plurality of structural objects that are similar to the target structural object, it is possible to estimate the state of the target structural object after several years.

[Program]

A program according to an exemplary embodiment of the present invention may be a program that causes a computer to execute steps A1 to A3 shown in FIG. 4 and steps B1 to B3 shown in FIG. 5. It is possible to realize the state estimation apparatus and state estimation method according to the present exemplary embodiment by installing this program onto a computer and executing the program. If this is the case, the processor of the computer functions as the acquisition unit 2, the learning unit 3, the classification unit 23, the estimation unit 24, and the output information generation unit 25, and performs processing.

Also, the program according to the present exemplary embodiment may be executed by a computer system constituted by a plurality of computers. If this is the case, for example, each computer may function as any of the classification unit 23, the estimation unit 24, and the output information generation unit 25 in addition to the acquisition unit 2 and the learning unit 3.

[Physical Configuration]

Figure 6:
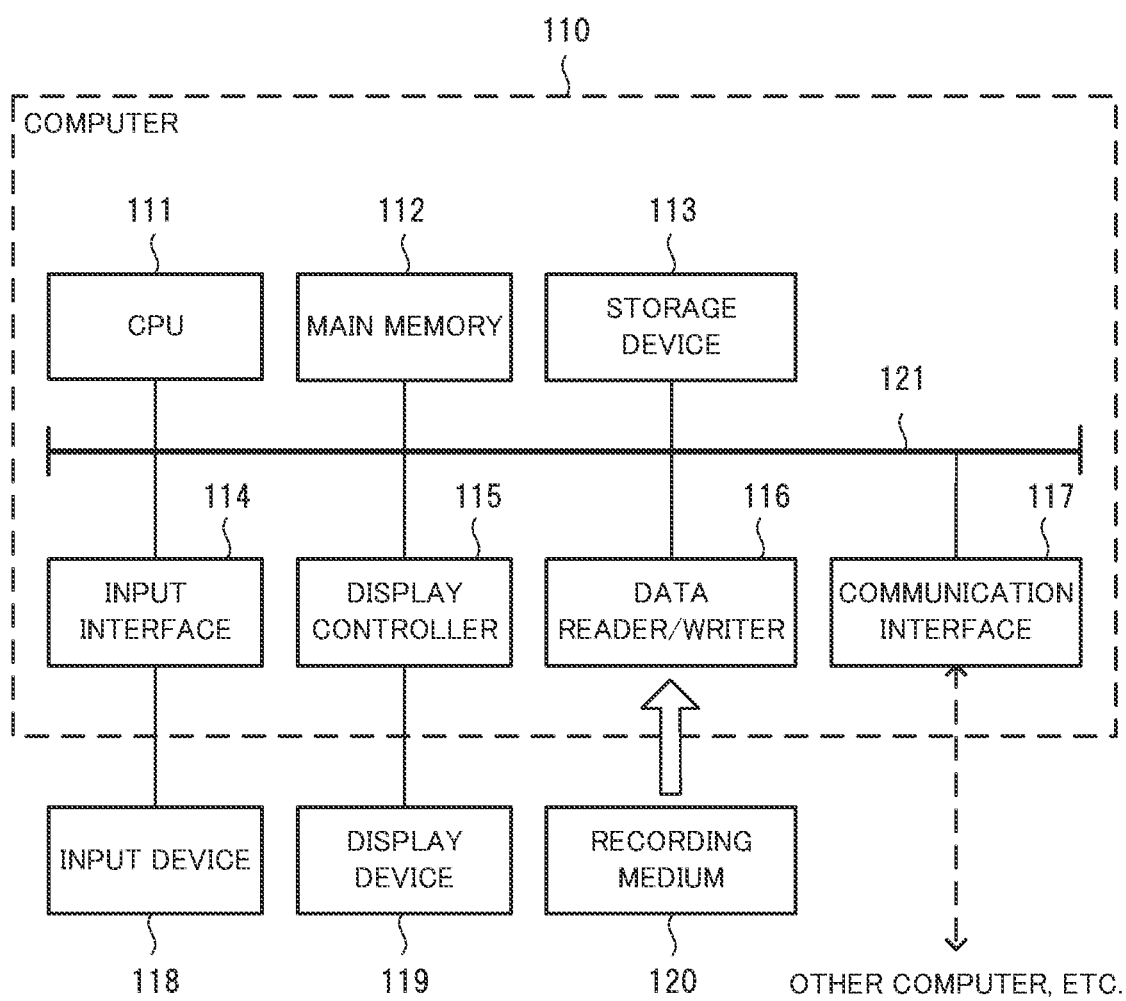
FIG. 6 is a diagram showing an example of a computer for realizing the state estimation apparatus.

Here, a computer that executes a program according to an exemplary embodiment to realize a state estimation apparatus will be described with reference to FIG. 6. FIG. 6 is a block diagram showing an example computer that realizes a state estimation apparatus according to an exemplary embodiment of the present invention.

As shown in FIG. 6, a computer 110 includes a CPU 111, a main memory 112, a storage device 113, an input interface 114, a display controller 115, a data reader/writer 116, and a communication interface 117. These units are connected via bus 121 so as to be able to perform data communication with each other. Note that the computer 110 may include a GPU (Graphics Processing Unit) or a FPGA (Field-Programmable Gate Array) in addition to the CPU 111 or instead of the CPU 111.

The CPU 111 loads a program (codes) according to the present exemplary embodiment stored in the storage device 113 to the main memory 112, and executes them in a predetermined order to perform various kinds of computations. The main memory 112 is typically a volatile storage device such as a DRAM (Dynamic Random Access Memory). Also, the program according to the present exemplary embodiment is provided in the state of being stored in a computer-readable recording medium 120. Note that the program according to the present exemplary embodiment may be distributed on the Internet that is connected via the communication interface 117.

Specific examples of the storage device 113 include a hard disk drive, and a semiconductor storage device such as a flash memory. The input interface 114 mediates data transmission between the CPU 111 and the input device 118 such as a keyboard or a mouse. The display controller 115 is connected to a display device 119, and controls the display of the display device 119.

The data reader/writer 116 mediates data transmission between the CPU 111 and the recording medium 120, and reads out the program from the recording medium 120 and writes the results of processing performed in the computer 110 to the recording medium 120. The communication interface 117 mediates data transmission between the CPU 111 and another computer.

Specific examples of the recording medium 120 include general-purpose semiconductor storage devices such as a CF (Compact Flash (registered trademark)) and a SD (Secure Digital), a magnetic recording medium such as a flexible disk, and an optical recording medium such as a CD-ROM (Compact Disk Read Only Memory).

Note that the state estimation apparatus 1 according to the present exemplary embodiment can also be realized by using hardware corresponding to the units, in place of a computer that has the program installed therein. Furthermore, a configuration may be adopted in which a portion of the state estimation apparatus 1 is realized by a program, and the remaining portion is realized by hardware.

[Supplementary Note]

The following supplementary notes are also disclosed in relation to the above-described exemplary embodiment. Although at least one or all of the above-described exemplary embodiments can be expressed as, but are not limited to, (Supplementary note 1) to (Supplementary note 12) described below.

(Supplementary Note 1)

A state estimation apparatus including:

an acquisition unit that acquires deterioration information indicating a deterioration state of each structural object; and a learning unit that learns common information that is common between pieces of the deterioration information and estimation index information that is used for estimating a deterioration state of a target structural object, using the deterioration information as input.

(Supplementary Note 2)

The state estimation apparatus according to Supplementary Note 1, further including:

a classification unit that classifies, in the learning, the deterioration information using one of or both an environment condition indicating an environment state when the deterioration information was measured and structural object information indicating a structure of the structural object.

(Supplementary Note 3)

The state estimation apparatus according to Supplementary Note 1 or 2, further including:

an estimation unit that receives the deterioration information of the target structural object, and estimates a deterioration state of the target structural object using the common information and the estimation index information.

(Supplementary Note 4)

The state estimation apparatus according to any one of Supplementary Notes 1 to 3, wherein the deterioration information is a resonance angular vibration frequency and a damping ratio, and the estimation index information is a probability density ratio.

(Supplementary Note 5)

A state estimation method including:

(a) a step of acquiring deterioration information indicating a deterioration state of each structural object; and (b) a step of learning common information that is common between pieces of the deterioration information and estimation index information that is used for estimating a deterioration state of a target structural object, using the deterioration information as input.

(Supplementary Note 6)

The state estimation method according to Supplementary Note 5, further including:

(c) a step of classifying, in the learning, the deterioration information using one of or both an environment condition indicating an environment state when the deterioration information was measured and structural object information indicating a structure of the structural object.

(Supplementary Note 7)

The state estimation method according to Supplementary Note 5 or 6, further including:

(d) a step of receiving the deterioration information of the target structural object, and estimating a deterioration state of the target structural object using the common information and the estimation index information.

(Supplementary Note 8)

The state estimation method according to any one of Supplementary Notes 5 to 7, wherein the deterioration information is a resonance angular vibration frequency and a damping ratio, and the estimation index information is a probability density ratio.

(Supplementary Note 9)

A computer-readable recording medium that includes a program recorded thereon, the program including instructions that cause a computer to carry out:

(a) a step of acquiring deterioration information indicating a deterioration state of each structural object; and (b) a step of learning common information that is common between pieces of the deterioration information and estimation index information that is used for estimating a deterioration state of a target structural object, using the deterioration information as input.

(Supplementary Note 10)

The computer-readable recording medium according to Supplementary Note 9 that includes a program recorded thereon, the program including instructions that cause a computer to carry out:

(c) a step of classifying, in the learning, the deterioration information using one of or both an environment condition indicating an environment state when the deterioration information was measured and structural object information indicating a structure of the structural object.

(Supplementary Note 11)

The computer-readable recording medium according to Supplementary Note 9 or 10 that includes a program recorded thereon, the program including instructions that cause a computer to carry out:

(d) a step of receiving the deterioration information of the target structural object, and estimating a deterioration state of the target structural object using the common information and the estimation index information.

(Supplementary Note 12)

The computer-readable recording medium according to any one of Supplementary Notes 9 to 11:

wherein the deterioration information is a resonance angular vibration frequency and a damping ratio, and the estimation index information is a probability density ratio.

Although the present invention has been described above with reference to the example embodiments above, the invention is not limited to the above example embodiments. Various modifications understandable to a person skilled in the art can be made to configurations and details of the invention, within the scope of the invention.

INDUSTRIAL APPLICABILITY

As described above, according to the present invention, it is possible to accurately estimate the deterioration state of a structural object. The present invention is useful in a technical field in which deterioration state of structural object needs to be estimated.

LIST OF REFERENCE SIGNS

1 State estimation apparatus
2 Acquisition unit
3 Learning unit
20 System
21 Storage device
22 Output device
23 Classification unit
24 Estimation unit
25 Output information generation unit
31 Deterioration information
32 Structural object information
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A state estimation apparatus comprising:
one or more processors; and
a memory storing instructions executable by the one or more processors to:
acquire deterioration information indicating a deterioration state of each structural object; and
learn common information that is common between pieces of the deterioration information and estimation index information that is used for estimating a deterioration state of a target structural object, using the deterioration information as input,
wherein the deterioration information is a resonance angular vibration frequency and a damping ratio, and the estimation index information is a probability density ratio.

2. The state estimation apparatus according to claim 1, wherein the instructions are executable by the one or more processors to further:
classify, in the learning, the deterioration information using one of or both an environment condition indicating an environment state when the deterioration information was measured and structural object information indicating a structure of the structural object.

3. The state estimation apparatus according to claim 1, wherein the instructions are executable by the one or more processors to further:
receive the deterioration information of the target structural object, and estimates a deterioration state of the target structural object using the common information and the estimation index information.

4. A state estimation method comprising:
acquiring deterioration information indicating a deterioration state of each structural object; and
learning common information that is common between pieces of the deterioration information and estimation index information that is used for estimating a deterioration state of a target structural object, using the deterioration information as input,
wherein the deterioration information is a resonance angular vibration frequency and a damping ratio, and the estimation index information is a probability density ratio.

5. The state estimation method according to claim 4, further comprising:
classifying, in the learning, the deterioration information using one of or both an environment condition indicating an environment state when the deterioration information was measured and structural object information indicating a structure of the structural object.

6. The state estimation method according to claim 4, further comprising:
receiving the deterioration information of the target structural object, and estimating a deterioration state of the target structural object using the common information and the estimation index information.

7. A non-transitory computer-readable recording medium that includes a program recorded thereon, the program including instructions that cause a computer to carry out processing comprising:
acquiring deterioration information indicating a deterioration state of each structural object; and
learning common information that is common between pieces of the deterioration information and estimation index information that is used for estimating a deterioration state of a target structural object, using the deterioration information as input,
wherein the deterioration information is a resonance angular vibration frequency and a damping ratio, and the estimation index information is a probability density ratio.

8. The non-transitory computer-readable recording medium according to claim 7, wherein the processing further comprises:
classifying, in the learning, the deterioration information using one of or both an environment condition indicating an environment state when the deterioration information was measured and structural object information indicating a structure of the structural object.

9. The non-transitory computer-readable recording medium according to claim 7, wherein the processing further comprises:
receiving the deterioration information of the target structural object, and estimating a deterioration state of the target structural object using the common information and the estimation index information.

* * * * *